United States Patent [19]
Foerstner

[11] 3,809,486
[45] May 7, 1974

[54] MECHANICAL COUPLING ARRANGEMENT

[75] Inventor: Richard A. Foerstner, Iowa City, Iowa

[73] Assignee: Amana Refrigeration, Inc., Amana, Iowa

[22] Filed: Aug. 17, 1972

[21] Appl. No.: 281,574

Related U.S. Application Data
[62] Division of Ser. No. 131,618, April 6, 1971, abandoned.

[52] U.S. Cl. ................................ 403/374, 403/409
[51] Int. Cl. ................................................ F16b 1/00
[58] Field of Search ......... 287/1; 269/236; 292/259; 220/55 P; 24/263 LL, 263 B, 134 E, 134 EA, 19, 273, 115 G, 132 WL, 132 HL; 219/10.55; 403/373, 374, 323, 324, 409

[56] References Cited
UNITED STATES PATENTS

| | | | |
|---|---|---|---|
| 1,488,866 | 4/1924 | Clark .............................. | 269/236 X |
| 2,167,952 | 8/1939 | Jordan............................ | 24/134 E |
| 974,637 | 11/1910 | Borup ............................. | 24/115 G |
| 1,566,483 | 12/1925 | Kraeer ............................ | 269/236 X |

*Primary Examiner*—Andrew V. Kundrat
*Attorney, Agent, or Firm*—Edgar O. Rost; Harold A. Murphy; Joseph D. Pannone

[57] ABSTRACT

A mechanical arrangement is disclosed for interconnecting structures by exerting equidistant upward forces to one component and an intermediate downward force to the adjacent component. A twisting motion of rotatably disposed locking members actuates the coupling. In an illustrative embodiment a magnetron energy generator and magnetic field producing means, such as an electromagnet, are coupled together by support and housing structures actuated by rigid elongated metallic bars which provide a positive locking force.

2 Claims, 7 Drawing Figures

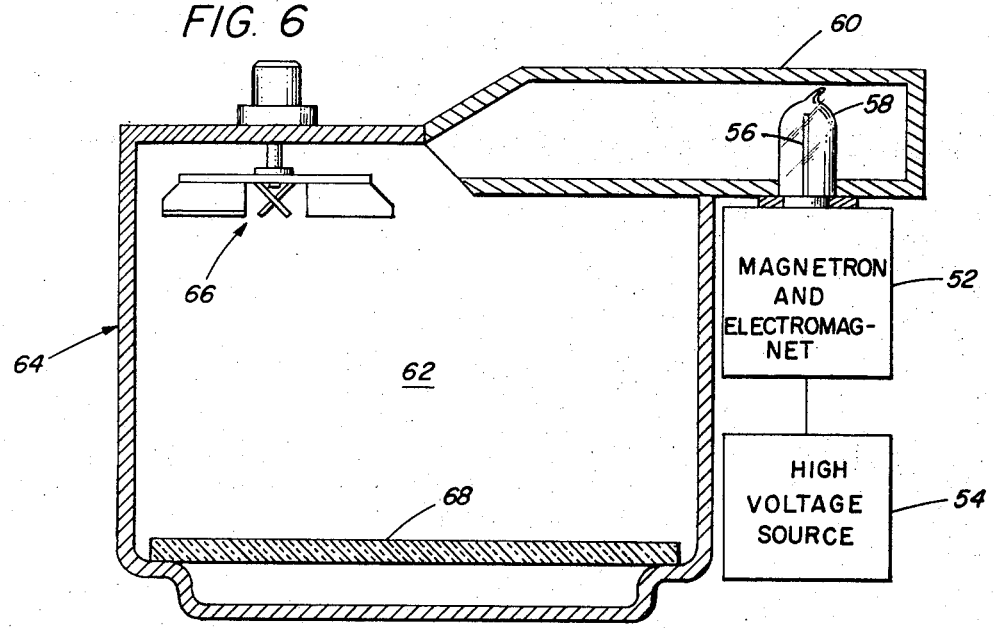
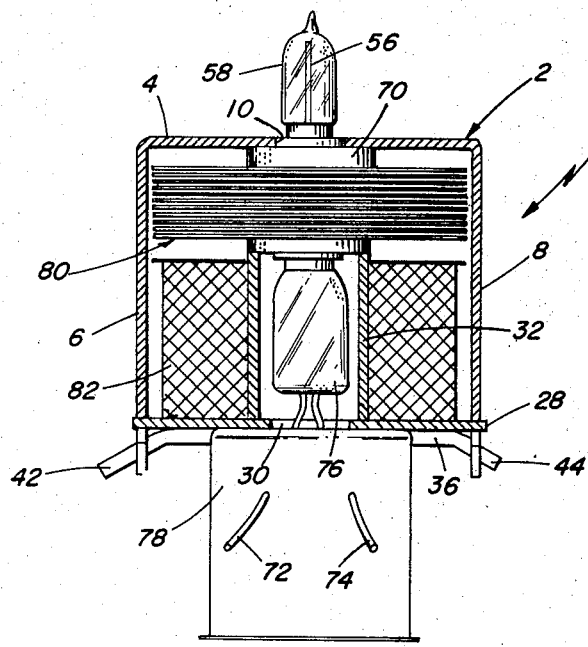
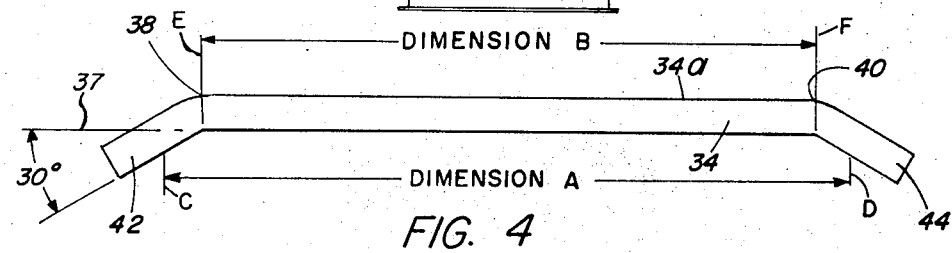

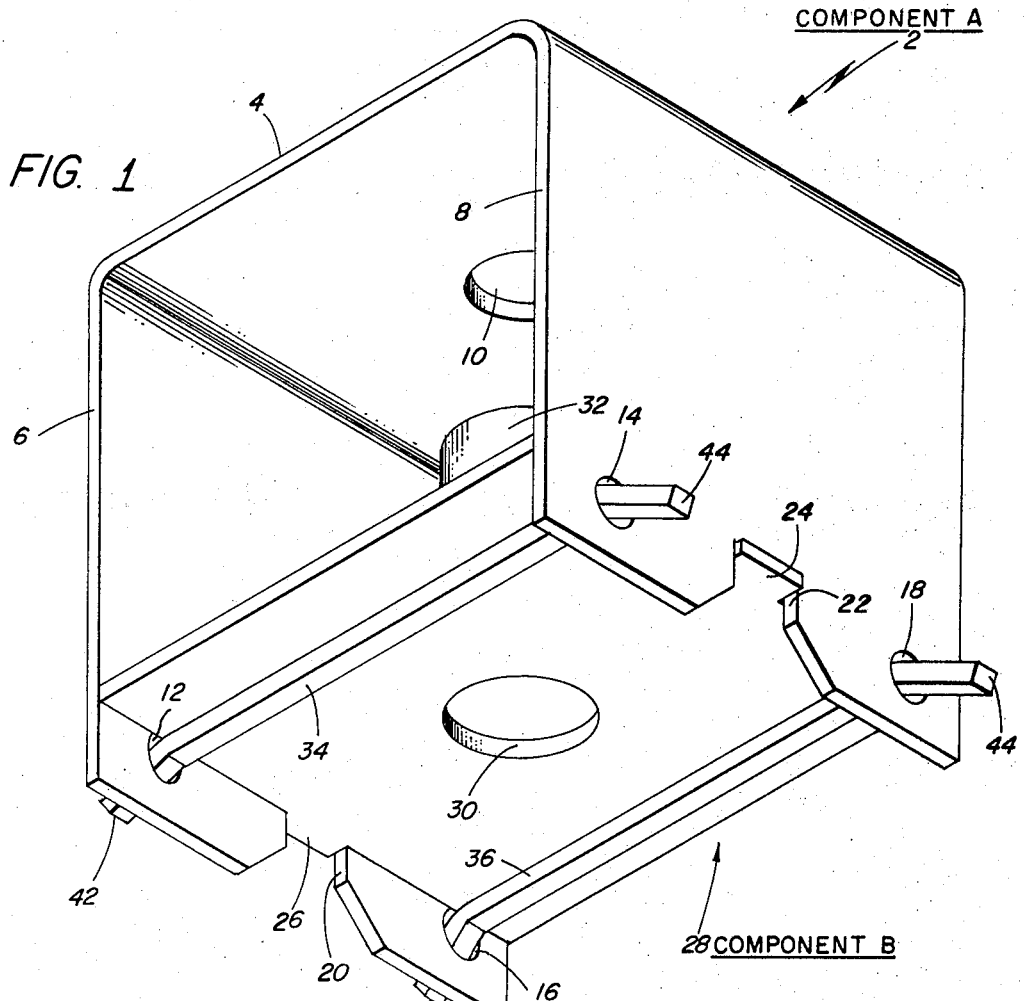
FIG. 1
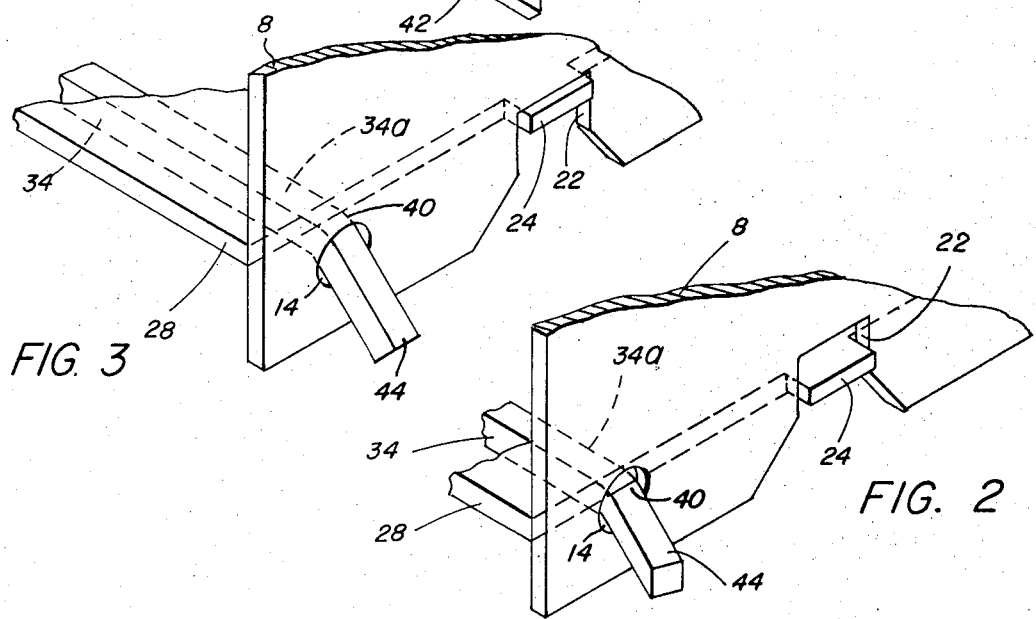
FIG. 3
FIG. 2

3,809,486

MECHANICAL COUPLING ARRANGEMENT

This is a division of application Ser. No. 131,618 filed Apr. 6, 1971, and now U.S. Pat. No. 3,702,386.

BACKGROUND OF THE INVENTION

1. Field of the Invention

The invention relates to mechanical coupling arrangements, particularly for heavy or bulky components.

2. Description of the Prior Art

Prior art mechanical arrangements for coupling components generally utilize plural fastening members, such as bolts, slotted or Allen set screws along with ancillary structures, such as brackets, flanges and the like. This results in some applications in higher product costs and frequently breakage or damage of components when replacement is required. Further, accessibility is often a factor which can result in high labor costs.

In an illustrative application the coupling of an external electromagnet to a magnetron oscillator device for use in high frequency heating apparatus results in a combined assembly occupying a relatively large space and an overall weight of between 15 to 20 pounds. The support and housing structure is conventionally fabricated of steel plate enclosing the components as well as defining a magnetic return path. The initial installation of the combined assembly in the oven apparatus ovens, as well as replacement after operation, when required, has been hampered by space and weight considerations with present day coupling structures. The magnetron energy generators under consideration have a dielectric dome member housing an antenna inserted within waveguide means to propagate the energy within a cooking enclosure. Handling and manipulation can result in damage of the dielectric and loss of an expensive component. A simple and inexpensive coupling arrangement for mechanical components is, therefore, desirable, particularly for relatively heavy or bulky components.

SUMMARY OF THE INVENTION

In accordance with the teachings of the invention, a coupling arrangement is disclosed comprising substantially equidistant rigid elongated locking members extending within aligned openings in opposing walls of one of the components to be coupled. Such members define at least one substantially planar surface adapted to engage and move upwardly a second component upon actuation by a twisting mechanical motion. The upward motion establishes a second resting or interference point for the locking members within the walls of the openings and securely retains the coupled components. No further coupling means are required and the material for the locking members is selected in accordance with the weight and mass of the components involved. The locking members are provided with a moderate bend at each end to establish the dimension differential required in the upward travel to secure the positive locking force.

BRIEF DESCRIPTION OF THE DRAWINGS

Details of the invention as well as an illustrative embodiment will be readily understood after consideration of the following description and reference to the accompanying drawings, wherein:

FIG. 1 is an isometric view of the illustrative embodiment of the invention;

FIG. 2 is a fragmentary isometric view of the illustrative embodiment prior to the actuation of the coupling arrangement;

FIG. 3 is a fragmentary isometric view of the coupled components after actuation of the arrangement;

FIG. 4 is an elevation view of the locking members of the illustrative embodiment;

FIG. 5 is a cross-sectional view of an alternative embodiment of the locking members;

FIG. 6 is a vertical cross-sectional view of a heating apparatus embodying the present invention; and FIG. 7 is a side view partly in section of a magnetron energy generator assembly utilizing the illustrative embodiment of the invention.

DESCRIPTION OF THE PREFERRED EMBODIMENT

High frequency electrical energy heating apparatus commonly utilizes a magnetron generator with such energy being launched within a suitable enclosure providing a heating chamber. An exemplary device for generating such energy is the magnetron oscillator also used in radar systems. The text "Microwave Magnetrons," Radiation Laboratory Series, Vol. 6, by G. B. Collins, McGraw-Hill Book Company, Inc., 1948, describes in detail the construction and operation of such energy generators. Conventionally, a dielectric dome member encloses a conductive wire antenna for radiating the high frequency waves within the heating chamber. Further information regarding an exemplary application of the invention is also available in United States Letters Patent No. 3,531,613 issued Sept. 29, 1970. The magnetron assembly may incorporate an externally mounted electromagnet surrounding the magnetic pole piece member for directing the magnetic field within the electron interaction space as well as magnetic field return path means. High voltage leads from a suitable source are connected to the magnetron cathode and are RF shielded by feedthrough capacitors adjacent to the electromagnet support to complete the assembly. In heating apparatus in present day usage, the overall magnetron generator assembly may weigh as much as 20 pounds due to the large magnetic fields required. An illustration of an exemplary prior art embodiment of the magnetic field and magnetron oscillator securing and housing means incorporating plural screw fasteners as well as clamps and brackets is available in the afore-referenced Letters Patent. The positioning of the energy antenna enclosure member will also be readily discerned.

Referring to FIGS. 1–3 inclusive, the illustrative embodiment of the novel mechanical coupling arrangement will be described. A fixed substantially U-shaped three-sided member 2 is shown which will also be referred to in the description as "Component A" for convenience. The member 2 may, for example, be employed as a magnetron assembly housing and retaining member for the electromagnet type device. Top wall 4 and parallel side walls 6 and 8 are defined by the structure. For the intended use as a housing and retainer member for a magnetron oscillator, opening 10 is provided for the insertion of the dielectric dome member. Opposing sidewalls 6 and 8 have aligned openings 12 and 14 as well as 16 and 18. At an intermediate point in each of the sidewalls between the aligned openings, a notch 20 and 22 is provided. The dimensions of each notch is adapted to receive oppositely disposed tab portions 24 and 26 extending from the peripheral walls of movable support plate member 28, again designated for ease in understanding the invention as "Component B." An oppositely disposed opening 30 may be provided in member 28 aligned for insertion of high voltage leads and the cathode support assembly through cylindrical pole piece member 32. Parallel equidistant locking members 34 and 36 having at least one substantially planar surface 34a and 36a are disposed within the aligned openings 12, 14, 16 and 18 to provide actuating means adjacent to the extremities of plate member 28 for exerting an upward force. Substantially rigid elongated square bar members are shown in this embodiment. The ends 42 and 44 of each locking member are provided with a moderate angular bend of approximately 30° measured from a reference plane 37 extending along the side opposite to surfaces 34a and 36a. A knee portion 38 and 40 is thus provided and the bent ends 42 and 44 provide convenient handles for the twisting mechanical motion to be hereinafter described. Locking members 34 and 36 are fabricated of a metal such as, for example, cold rolled steel to provide rigidity. Openings 12, 14, 16 and 18 permit rotation thereof within the aligned opening walls.

In FIG. 4, the dimensions utilized for coupling mechanical Components A and B are illustrated to assist in an understanding of the invention. Member 2 has a dimension between walls 6 and 8 to accommodate member 28 with the tab portions 24 and 26 positioned within slots 20 and 22. After twisting mechanical actuation of members 34 and 36 the tab portions are securely locked in the slots. Dimension A is selected to represent the overall outer dimensions of Component A which in an operative embodiment had an approximate dimension of 5 inches. This represents a distance between two interference points C and D relative to the aligned opening walls when the locking bar members are disposed on their sides with surface 34a in a non-contacting position with Component B. Planar surface 34a has a reduced dimension to provide two new interference points E and F indicated by dimension B. The differential in this embodiment represents the approximate distance of travel of tab portions 24 and 26 within slots 20 and 22 to positively lock the Component B within Component A after the twisting actuation motion. In the operative embodiment to provide a travel distance of approximately three-eighths of an inch dimension B was reduced to 4½ inches.

Referring next to FIGS. 2 and 3, the operation of the disclosed structure is illustrated. In FIG. 2, the extending tab portion 24 of member 28 is shown spaced within the notch 22. In this position the locking member 34 is resting on its side with the end portions 42 and 44 contained within a reference plane coplanar to that of member 28. In this position outermost interference points C and D contact the walls of aligned openings 12 and 14.

In FIG. 3, actuation of either end portion by a twisting motion of results in a 90° rotation of the flat surfaces and an equidistant exertion of an upward force on member 28 and tab portions 24 and 26. The upward movement of the tab portions 24 and 26 securely and positively couples Components A and B with new interference points E and F resting against the underside of member 28 in addition to the points resting against the walls of the aligned openings. A downward force is exerted by the terminal walls of notches 20 and 22 on the member 28 with the combination of forces retaining the coupled components. The selection of the differential dimensions A and B establishes a close fit of the arrangement.

Locking members 34 and 36 have been illustrated as having a substantially square configuration to provide the planar surface 34a and 36a. In FIG. 5, an alternative arrangement is disclosed wherein the cross section of a locking member 46 is illustrated having a planar surface 48 together with an arcuate surface 50 for engaging the component to be moved upwardly. While reference has been made to the utilization of metals such as cold rolled steel due to the use as a magnetic housing an retaining member, any other suitable materials may be utilized in the practice of the invention for many different applications.

FIGS. 6 and 7 are illustrative of a particular application of the structure of the invention in the coupling of an electromagnet externally to a magnetron oscillator device for a high frequency heating apparatus. In this embodiment, the overall energy generator assembly is indicated by block 52 coupled to electrical controls and the high voltage source indicated by block 54. The electromagnetic energy is fed from generator 52 by means of a radiating probe 56 housed within dielectric dome member 58 through a launching waveguide section 60 to radiate within the chamber 62 defined by the walls of conductive enclosure 64. The energy may be distributed within the chamber by, for example, a stirrer 66 or any other means known in the art. The articles to be heated are supported on dielectric plate 68 within chamber 62 and a door (not shown) encloses an access opening.

The magnetron energy generator assembly 52 includes the oscillator device having conductive envelope 70 within which an anode having plural resonant cavities is housed as well as an indirectly heated central cathode. High voltage leads 72 and 74 extend from the oscillator through the cathode support assembly 76 to the bypass capacitor means housed within box member 78 secured to the bottom side of the plate member 28. Cooling fins 80 provide for the direction of circulating air for the rapid removal of the heat generated by the high frequency oscillations.

Electromagnet 82 formed by a large number of turns of a conductive wire is provided with a central aperture adapted to receive cylindrical cathode pole piece member 32 also secured to plate member 28. After positioning the electromagnet the magnetron generator is positioned with the cathode support assembly 76 extending within the pole piece member 32 and envelope 70 resting on the inner wall of this member. Magnetic housing and retaining member 2 is then positioned with the slots 20 and 22 engaging the tab portions 24 and 26 of plate member 28. After a quarter or 90° twist turn by actuating locking members 34 and 36, the coupling of the desired components is completed. The overall assembly is mounted by any suitable means to communicate with waveguide 60 by bracket means (not shown) or direct fastening by screw means of the magnetic housing member 2 to a waveguide wall. During the operation of the heating apparatus, the magnetron oscillator device may be readily replaced by reversing the coupling procedure and twist rotation of the locking members 34 and 36. After the insertion of a new device, the assembly may again be secured by the steps hereinbefore outlined.

There is thus disclosed an efficient mechanical arrangement for use in coupling components by a simple twisting mechanical motion of parallel locking members capable of supporting any large masses. Installation and replacement are readily simplified and a substantial number of hand operations utilized in the prior art assemblies are eliminated with tube breakage also substantially reduced. Modifications and variations in the structure will be readily apparent to those skilled in the art. It is intended, therefore, that the foregoing illustrative embodiment and detailed description be considered in the broadest aspects and not in a limiting sense.

What is claimed is:

1. A mechanical coupling arrangement comprising:
   a movable component having tab portions extending from opposite ends;
   a fixed component having in each of a pair of opposed walls flanking said movable component aligned openings and slots intermediate said openings dimensioned to receive said tab portions;
   plural locking members each having at least one planar surface rotatably disposed within said openings and extending between said opposed walls and adapted to engage the walls of said openings and said movable component at two different oppositely disposed interference points when actuated by a rotating mechanical motion to raise the movable component relative to the fixed component;
   the distance between the outermost interference points being substantially equal to the other dimensions of said fixed component; and
   the distance between the remaining interference points being reduced by substantially the distance of travel of said tab portions within said slots.

2. A mechanical coupling arrangement according to claim 1 wherein said locking members comprise substantially elongated bars having a substantially square cross-section.

* * * * *